(12) United States Patent
Knapp et al.

(10) Patent No.: US 9,879,645 B2
(45) Date of Patent: Jan. 30, 2018

(54) CONTROL VALVE BOUNCE LIMITING MECHANISM FOR FUEL INJECTORS

(71) Applicant: Caterpillar Inc., Peoria, IL (US)

(72) Inventors: Norman D. Knapp, Roanoke, IL (US); David E. Martin, Dunlap, IL (US); Dianqi Fang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/046,497

(22) Filed: Feb. 18, 2016

(65) Prior Publication Data
US 2017/0241392 A1 Aug. 24, 2017

(51) Int. Cl.
*F02M 63/00* (2006.01)
*F16K 31/06* (2006.01)

(52) U.S. Cl.
CPC .... *F02M 63/0035* (2013.01); *F02M 63/0015* (2013.01); *F02M 63/0054* (2013.01); *F16K 31/0655* (2013.01)

(58) Field of Classification Search
CPC ........... F02M 63/0035; F02M 63/0015; F02M 63/0054; F16K 31/0655
USPC ....................................... 239/585.5
See application file for complete search history.

(56) References Cited

U.S. PATENT DOCUMENTS

| | | | |
|---|---|---|---|
| 4,540,155 A * | 9/1985 | Redston | F02M 59/366 251/129.2 |
| 4,750,675 A | 6/1988 | Sczomak | |
| 5,127,585 A | 7/1992 | Mesenich | |
| 5,271,371 A * | 12/1993 | Meints | F02M 55/02 123/446 |
| 5,271,565 A | 12/1993 | Cerny | |
| 5,651,501 A | 7/1997 | Maley et al. | |
| 5,901,941 A | 5/1999 | Ricco | |
| 6,029,682 A * | 2/2000 | Lewis | F02M 63/0017 137/1 |
| 6,145,805 A | 11/2000 | Smith, III et al. | |
| 6,260,776 B1 * | 7/2001 | Popp | F02M 47/046 239/124 |
| 6,367,769 B1 | 4/2002 | Reiter | |
| 6,575,388 B2 | 6/2003 | Aota et al. | |

(Continued)

FOREIGN PATENT DOCUMENTS

| | | |
|---|---|---|
| DE | 102011089198 A1 | 6/2013 |
| EP | 0096312 | 12/1983 |

(Continued)

*Primary Examiner* — Arthur O Hall
*Assistant Examiner* — Joel Zhou (57) ABSTRACT

A fuel injector control valve assembly is provided that comprises a valve actuating mechanism, a cage member that is operatively connected to the valve actuating mechanism, a poppet valve member that is operatively connected to the cage member and that defines a perimeter and a longitudinal axis, a valve sleeve member that is disposed about the poppet valve member, a shim that includes an upper surface that at least partially makes uninterrupted contact with the cage member and a lower surface that at least partially makes uninterrupted contact with the sleeve member, thereby providing a fluid seal about the perimeter of the poppet valve member, and a bounce limiting mechanism that is adjacent the shim and that is interposed between the cage member and at least one of either the poppet valve member and the valve sleeve member.

6 Claims, 10 Drawing Sheets

(56) References Cited

U.S. PATENT DOCUMENTS

| | | |
|---|---|---|
| 6,702,207 B2 | 3/2004 | Seelbach et al. |
| 6,719,224 B2 | 4/2004 | Takeuchi et al. |
| 2003/0189112 A1 | 10/2003 | Fukutomi et al. |
| 2006/0202144 A1* | 9/2006 | Ricco ............... F02M 47/027 251/129.16 |
| 2009/0108106 A1 | 4/2009 | Ciampolini et al. |
| 2014/0224903 A1* | 8/2014 | Fujino ............... F02M 51/0664 239/585.1 |

FOREIGN PATENT DOCUMENTS

| | | |
|---|---|---|
| EP | 1063419 A2 | 12/2000 |
| EP | 1471249 A1 | 10/2004 |
| EP | 2336544 A1 | 6/2011 |
| GB | 2093118 | 8/1982 |
| GB | 2138884 | 10/1984 |
| JP | H0512662 | 2/1993 |

* cited by examiner

CONTROL VALVE BOUNCE LIMITING MECHANISM FOR FUEL INJECTORS

TECHNICAL FIELD

The present disclosure relates generally to fuel injectors that use a control valve for controlling the injection of fuel into a combustion chamber of an engine. More specifically, the present disclosure relates to valve bounce limiting mechanisms that help to prevent undesirable after-injections that occur subsequent to a desired main injection event for such fuel injectors.

BACKGROUND

Fuel injection is well known in the art for injecting fuel into a combustion chamber of an engine that is subsequently mixed with air or oxygen and then combusted for powering the engine. Fuel injectors often use control valves that control the timing and duration of a fuel injection event into the combustion chamber. As can be imagined, components of fuel injectors including the control valve may experience forces from other components or from its own inertia that causes the valve member to move. For example, when the control valve contacts another component including a valve seat or an actuating component intended to move the valve into the proper position, the control valve or another operatively connected component may move or bounce. This can lead to undesirable consequences.

By way of further example, the control valve may initiate a desirable main fuel injection event and then be moved to another position in order to stop this injection event. However, because of the forces, velocity and inertia transference of and between the various components including the valve member, the control valve may be unintentionally moved from a position where the fuel injection is prohibited to one where it is allowed due to its unintentional bouncing or other movement. This may lead to secondary, tertiary, or other after-injection events that are not intended and that may lead to an undesirable operation of the engine that leads to other problems such as poor engine performance and increased emissions. Hence, methods and devices for eliminating such valve bounce have been developed and employed.

Some control valve assemblies for fuel injectors use a lift shim that is interposed between components that move relative to each other such as a valve sleeve member and a cage member. Such lift shims have recesses that communicate the fluid that is immediately around the valve body with a pressure relief pocket or the like. These recesses are located on the top and bottom surfaces of the shim that contact the valve sleeve and cage members. It has been discovered that this shim design allows an undesirable amount of valve bounce in some applications.

Therefore, it is desirable to develop a mechanism for preventing or limiting valve bounce for a fuel injector than has yet been devised for such applications.

SUMMARY OF THE DISCLOSURE

A fuel injector control valve assembly is provided that comprises a valve actuating mechanism, a cage member that is operatively connected to the valve actuating mechanism, a poppet valve member that is operatively connected to the cage member and that defines a perimeter and a longitudinal axis, a valve sleeve member that is disposed about the poppet valve member, a shim that includes an upper surface that at least partially makes uninterrupted contact with the cage member and a lower surface that at least partially makes uninterrupted contact with the sleeve member, thereby providing a fluid seal about the perimeter of the poppet valve member, and a bounce limiting mechanism that is adjacent the shim and that is interposed between the cage member and at least one of either the poppet valve member and the valve sleeve member.

A fuel injector assembly is provided that comprises a main injection assembly including: a housing that defines a pressurized fuel chamber, a nozzle assembly that includes a check valve assembly, and a control valve assembly including: a valve actuating mechanism, a cage member that is operatively connected to the valve actuating mechanism, a poppet valve member that is operatively connected to the cage member and that defines a perimeter and a longitudinal axis, a valve sleeve member that is disposed about the poppet valve member, an inner shim that includes an upper surface that at least partially makes uninterrupted contact with the cage member and a lower surface that at least partially makes uninterrupted contact with the sleeve member, thereby providing a fluid seal about the perimeter of the poppet valve member, and an outer shim that is taller than the inner shim along the longitudinal axis and that makes uninterrupted contact with at least one of the cage member and the valve sleeve member and that is immediately adjacent the inner shim.

A fuel injector assembly is provided that comprises a main injection assembly including: a housing that defines a pressurized fuel chamber, a nozzle that includes a check valve assembly, and a control valve assembly including: a valve actuating mechanism, a cage member that is operatively connected to the valve actuating mechanism, a poppet valve member that is operatively connected to the cage member and that defines a perimeter and a longitudinal axis, a valve sleeve member that is disposed about the poppet valve member, and wherein the cage member includes a lower surface and the poppet valve member includes an upper surface, wherein the lower surface interfaces with the upper surface, and the lower surface of the cage member and the upper surface of the poppet valve member are configured to provide a separable joint between the poppet valve member and the cage member and at least one of the cage member and poppet valve member defines a groove that communicates only with a surface that forms the separable joint.

DETAILED DESCRIPTION

Many engines now use an electronic control unit or module that manages the fuel system of the engine. More specifically, the electronic control module (ECM) meters the timing and duration of the injection of fuel into a combustion chamber. The amount of fuel injected may be altered by changing the electric signal sent to any one fuel injector unit. When a control valve assembly is present in the fuel injector, a solenoid may be used to effectuate opening and closing of the control valve, which in turn, leads to the desired amount of fuel being injected into the combustion chamber. The electric signal in such a case may be a voltage that energizes the solenoid for a precise period of time. This opens the control valve. When the signal is removed, the solenoid de-energizes and the control valve closes. The voltage signal may be a 105 volt signal in some applications. Of course, the timing of the voltage signal may also control the timing of the fuel injection.

The ECM is instrumental in controlling the injection of fuel into the combustion chamber in order to optimize various performances of the engine. One such performance is the limiting of emissions. A FRC fuel position is determined to limit the amount of fuel that is injected into a certain amount of air to prevent increasing emissions past an allowable limit. This limit is based on the boost pressure present in the air meaning that as the boost pressure increases, then the FRC fuel position also increases. The rated fuel position is also determined based on the horsepower rating of the engine. The electronic control of the rated fuel position is similar to what was once achieved using rack stops and a torque spring on a mechanically governed engine. This rated fuel position also provides the horsepower and torque curves for a specific horsepower rating. These limits are typically programmed by the engine manufacturer into the personality module of the ECM, helping to prevent tampering by the end user that could lead to undesirable emissions of the engine.

The timing of the injection may be determined based on various engine parameters including the engine load, speed etc. The ECM is able to determine the top center position of any cylinder from the signal that is provided by an engine speed or timing sensor as is known in the art. The ECM then calculates when the fuel injection should occur for any cylinder relative to the top center position. Then, the ECM provides the signal to the fuel injector at the appropriate time for causing the fuel injection into the combustion chamber of the cylinder.

Figure 1:
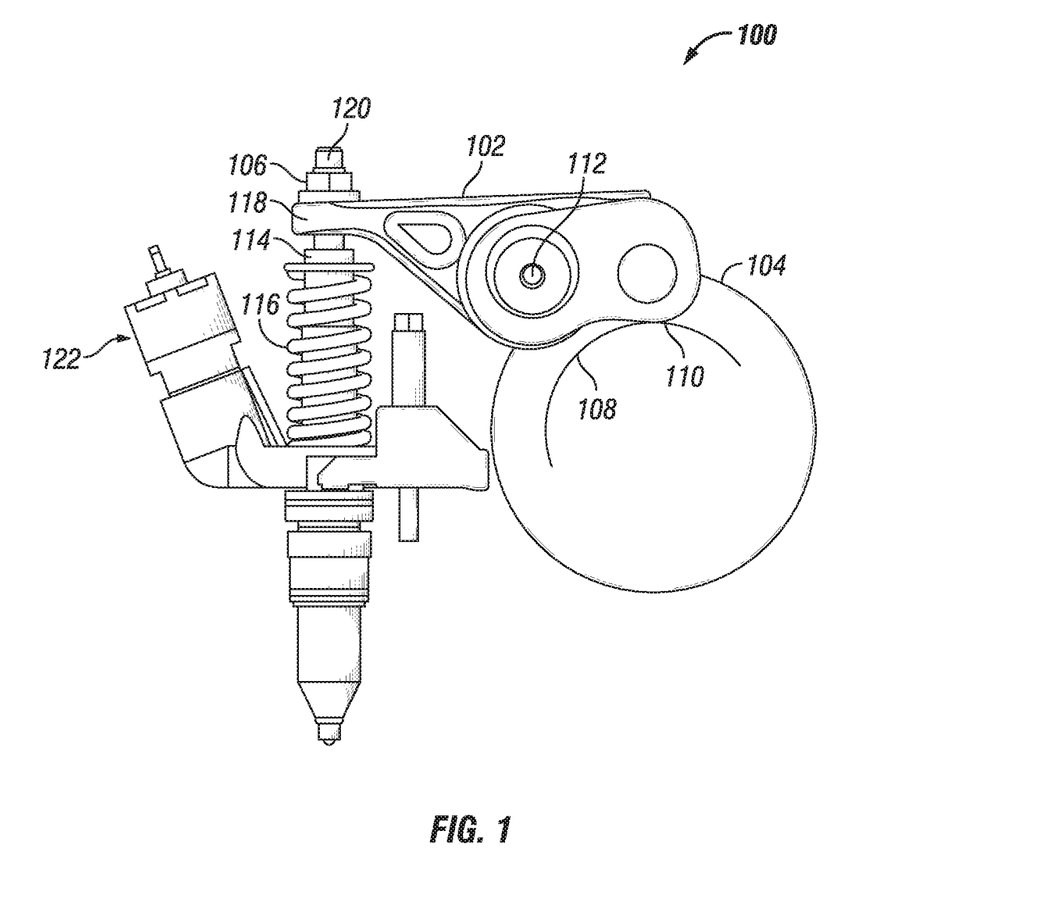
FIG. 1 is side view of a mechanical fuel injector assembly that uses a solenoid operated control valve and a cam shaft and rocker assembly that power a tappet for pressurizing fuel for injecting fuel according to one embodiment of the present disclosure.

Referring now to FIG. 1, an example of a portion of an engine that may be controlled by an ECM and that may include a bounce limiting mechanism according to any of the embodiments discussed herein is shown. The bounce limiting mechanism cannot be clearly seen with reference to FIG. 1 thru 6 but will be discussed in more detail with reference to FIG. 7 thru 11. It should be noted that the fuel injector and associated engine parts depicted in FIG. 1 thru 6 are provided only as an example and that the configuration of a fuel injector and the manner in which fuel pressurization is achieved for injection may be altered as desired and may include anything known or that will be devised in the art including mechanically pressurized fuel injectors, hydraulically pressurized fuel injectors, common rail fuel injectors, etc. Hence, any discussion of FIG. 1 thru 6 is merely intended to provide context and understanding on how some fuel injectors and control valve assemblies may work that employ a bounce limiting mechanism as is disclosed in the present disclosure and may not actually use such a bounce limiting mechanism depending on the application.

The engine is shown in FIG. 1 to comprise a fuel injector assembly 100, a rocker arm assembly 102, a cam shaft 104 and an adjustment nut 106. Though not shown in FIG. 1, the cam shaft 104 is driven by an idler gear that is in turn driven by a front gear train by the crankshaft gear. The gears of the front gear train are timed properly to provide the proper relationship between piston and valve movement. This timing is achieved by correctly aligning the timing marks of the gears during assembly. Typically, the cam shaft has three cam shaft lobes for each cylinder. Two of these lobes operate the opening and closing of the intake and exhaust valves. The third lobe 108 provides the mechanical force necessary to pressurize the fuel in the fuel injector assembly 100 as will be explained in further detail momentarily.

In operation as the cam shaft 104 rotates, the third lobe 108 contacts the roller curved follower surface 110 of the rocker arm assembly 102, which causes the rocker arm to pivot upwardly about its pivot point 112 on the right side of the pivot point 112. This causes the rocker arm to pivot downwardly on the left side of the pivot point 112, exerting force on the tappet 114 of the fuel injector assembly 100, while also compressing the return spring 116. The tappet 114 extends further into the fuel injector assembly 100 causing pressurization of the fuel. The adjustment nut 106 is located on top of the yoke 118 of the rocker arm assembly 102 that is used to connect the tappet 114 to the rocker arm assembly 102. Rotating the nut 106 causes the nut 106 to travel upwardly or downwardly on the threaded end 120 of the tappet 114, which may affect the amount of travel of the tappet or set the desired position of the plunger (not shown) in the injector. After the third lobe 108 passes the curved follower surface of the rocker arm assembly 102, the return spring 116 will cause the rocker arm on the left side to pivot upwardly and return to its original position.

The ECM (not shown) typically controls the operation of the control valve assembly 122 through four stages for this type of fuel injector assembly 100. These stages include pre-injection, injection, end-of-injection, and fill. As will be shown with reference to FIG. 2 thru 6, the fuel injector assembly uses a plunger that is disposed in a pressurized fuel chamber defined by a barrel or housing to pressurize the fuel to a pressure suitable for injection into the combustion chamber.

Figure 2:
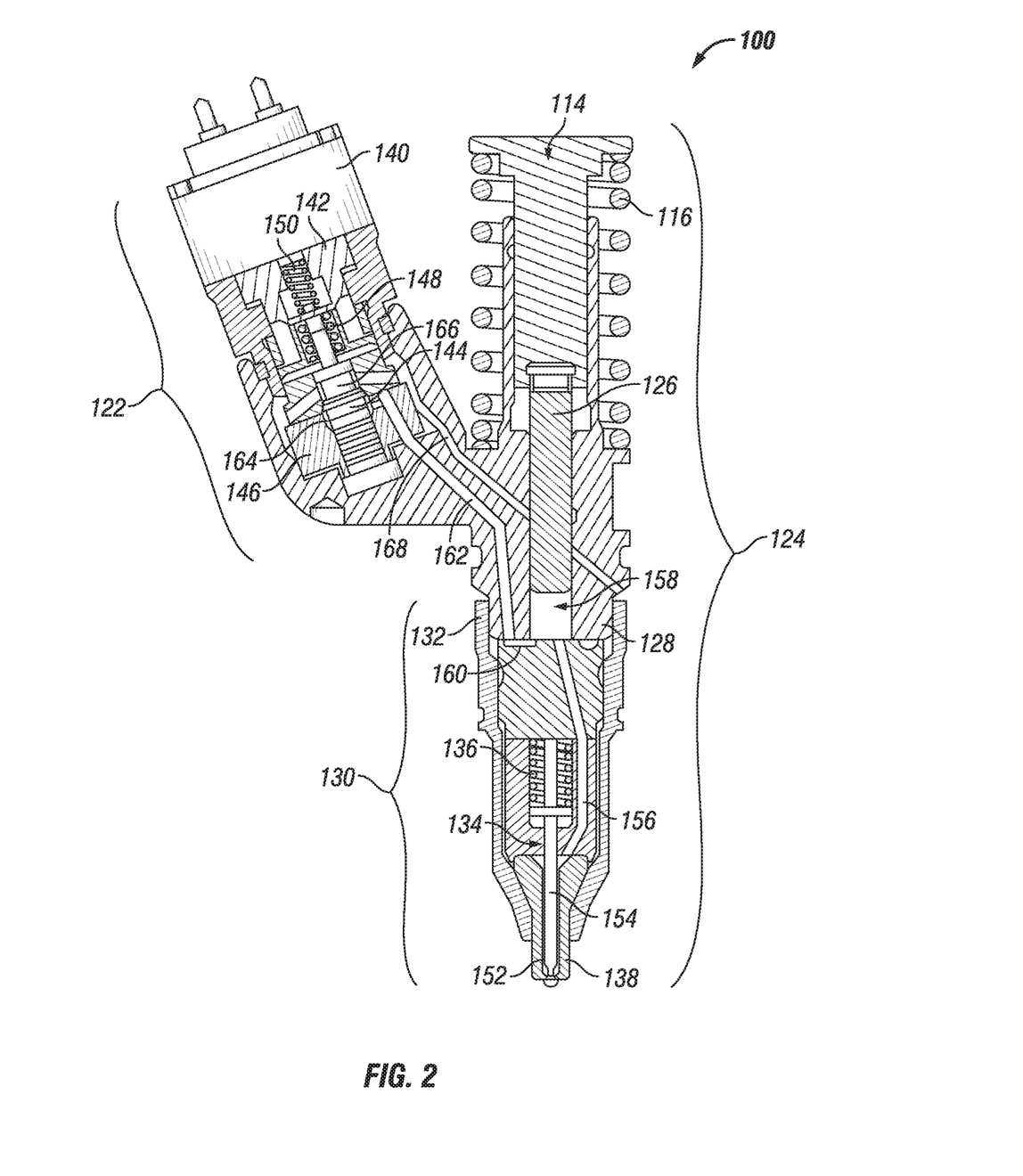
FIG. 2 is a side cross-sectional view of the fuel injector assembly of FIG. 1 showing the internal working components of the fuel injector more clearly.

Focusing now on FIG. 2, it shows the fuel injector assembly 100 includes the main injector assembly 124 and the control valve assembly 122. The components of the main injector assembly 124 include the tappet 114, the plunger 126, the housing 128 and the nozzle assembly 130. The nozzle assembly 130 includes a nozzle housing 132, check valve assembly 134, a check valve return spring 136, and nozzle tip 138. The cartridge valve or control valve assembly 122 includes the solenoid 140, armature 142, poppet valve member 144, a valve sleeve member 146, an over-travel spring 148, and a main return spring 150.

The fuel injector assembly may be mounted in a bore disposed in the cylinder head of the engine which has an integral fuel supply passage (not shown). An injector sleeve (not shown) may also be provided that separates the fuel injector assembly from the engine coolant in the water jacket. Some engines use a stainless steel sleeve. Such sleeves may fit into the cylinder head with a light press fit.

As shown in FIG. 2, the fuel injector assembly 100 defines a series of passages that are interconnected or in fluid communication with each other and may be selectively separated from each other by the control valve 122. That is to say, the fluid communication between the various passages may be turned on and off using the control valve 122.

Starting at the nozzle tip 138, it defines an injection passage 152 that surrounds the needle 154 of the check valve assembly 134. The injection passage 152 is in fluid communication with a feed passage 156 that extends upwardly through the nozzle assembly 130 and that is in fluid communication with the pressurized fuel chamber 158 that is defined by the housing 128 of the main injector assembly 124. Immediately above this space is the plunger 126 that may move downward and pressurize the fuel as will be described in further detail later herein. A reservoir 160 is in fluid communication with the pressurized fuel chamber 158 just to the left of the feed passage 156. A first exhaust passage 162 is in fluid communication with the reservoir 160 and leads to a control valve chamber 164 that is disposed around the perimeter of the grooved portion 166 of the poppet valve member 144. This control valve chamber 164 is in fluid communication with a second exhaust passage 168 that returns to a fuel tank or reservoir (not shown) at low pressure. The poppet valve member 144 selectively interrupts the fluid communication between the first and second exhaust passages in a manner that will be described momentarily.

Figure 3:
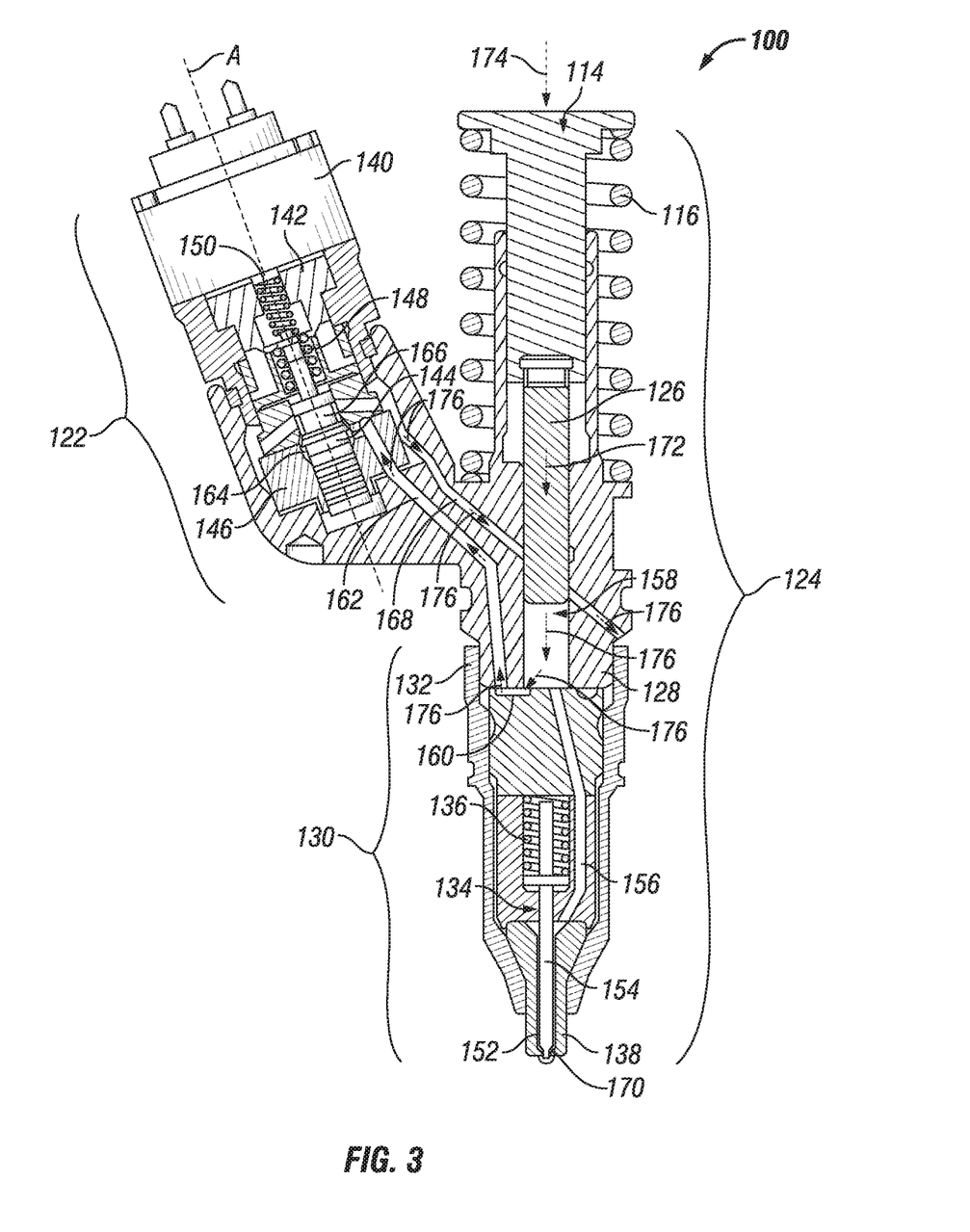
FIG. 3 depicts the fuel injector assembly of FIG. 2 in a pre-injection state.

Looking now at FIG. 3, the fuel injector assembly 100 is shown in its pre-injection configuration. Initially, the tappet 114 and plunger 126 are at their topmost position, naturally biased to this position by the return spring 116. At this position, the volume of fuel present in the pressurized fuel chamber 158 is at its greatest. At this time, the ECM does not send a voltage signal to the solenoid 140 of the control valve assembly 122, meaning that the solenoid is not energized and the poppet valve member 144, armature 142 and any other components therebetween are naturally biased by the main and over-travel return springs 150, 148 into their lowest position along the longitudinal axis A of the control valve assembly 122, which is defined by the various components such as the poppet valve member 144 that have substantially cylindrical configurations. Other configurations of these components are considered within the scope of the present disclosure.

As a consequence, the groove 166 of the poppet valve member 144 is in simultaneous fluid communication with the first exhaust passage 162, control valve chamber 164, and second exhaust passage 168. This establishes an open position for the poppet valve member 144 and control valve assembly 122 as will now be explained. The check valve 134 of the tip 138 is naturally biased to a closed position by the check valve return spring 136. This check valve 134 remains closed until enough fuel pressure is supplied to the angled surface 170 of the needle 154 of the check valve. As the plunger 126 and tappet 114 move downwards (see arrows 172, 174) into the pressurized fuel chamber 158 as the rocker arms pivots down on the tappet, the pressure of the fuel is not increased significantly in the fuel injector assembly and therefore the check valve remains closed. This is true because the fuel is free to flow from the pressurized fuel chamber 158, to the reservoir 160, through the first exhaust passage 162 to the control valve chamber 164 past the open poppet valve member 144, and finally through the second exhaust passage 168 (see arrows 176) to a low pressure fuel reservoir (not shown) via the fuel supply passage in the cylinder head (not shown).

Figure 4:
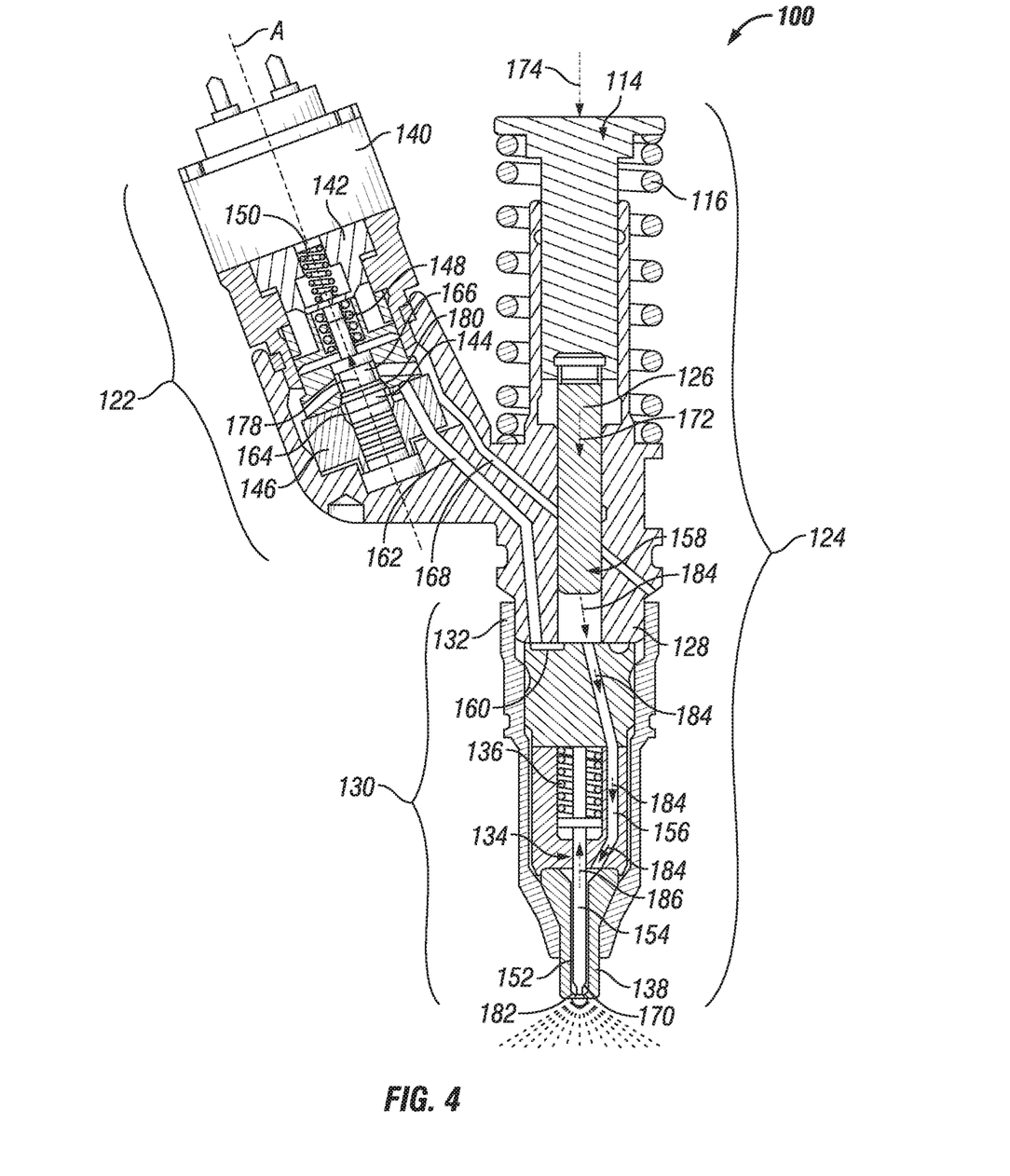
FIG. 4 shows the fuel injector assembly of FIG. 2 in an injection state.

Looking now at FIG. 4, the injection stage and configuration of the fuel injector assembly 100 in this stage is shown. This stage immediately follows the pre-injection stage just described with reference to FIG. 3. As the plunger 126 moves downwardly, the ECM sends a voltage signal to the solenoid 140 of the control valve assembly 122, which creates a magnetic field that attracts the armature 142, moving it upwards against the return spring forces. This causes the other components of the control valve assembly 122 to also move upwards including the poppet valve member 144 (see arrow 178) until it impinges on the poppet valve seat 180 formed by central bore of the valve sleeve member 146. At this time, the poppet valve member 144 is in the closed position blocking any flow of fuel from the first exhaust passage 162 to the poppet valve chamber 164 and to the secondary exhaust passage 168 that leads to the low pressure fuel reservoir (not shown).

Consequently, the plunger 126 and tappet 114 continue to move downwards (see arrows 172, 174), which results in a high pressurization of the fuel in the pressurized fuel chamber 158 of the main injection assembly. This pressure may reach 5 to 10 ksi, which causes the fuel to flow through the feed passage 156 to the injection passage 152 (see arrows 184) with enough force at the angled surface 170 at the tip of the needle 154 of the check valve 134 to overcome the force of the check valve return spring 136, causing the check valve to open by moving the needle away from the needle seat 182 (see arrow 186) and then fuel sprays out of the nozzle tip 138 into the combustion chamber (not shown). This is the start of the injection and continues until the ECM triggers opening of the control valve assembly that stops the injection.

Figure 5:
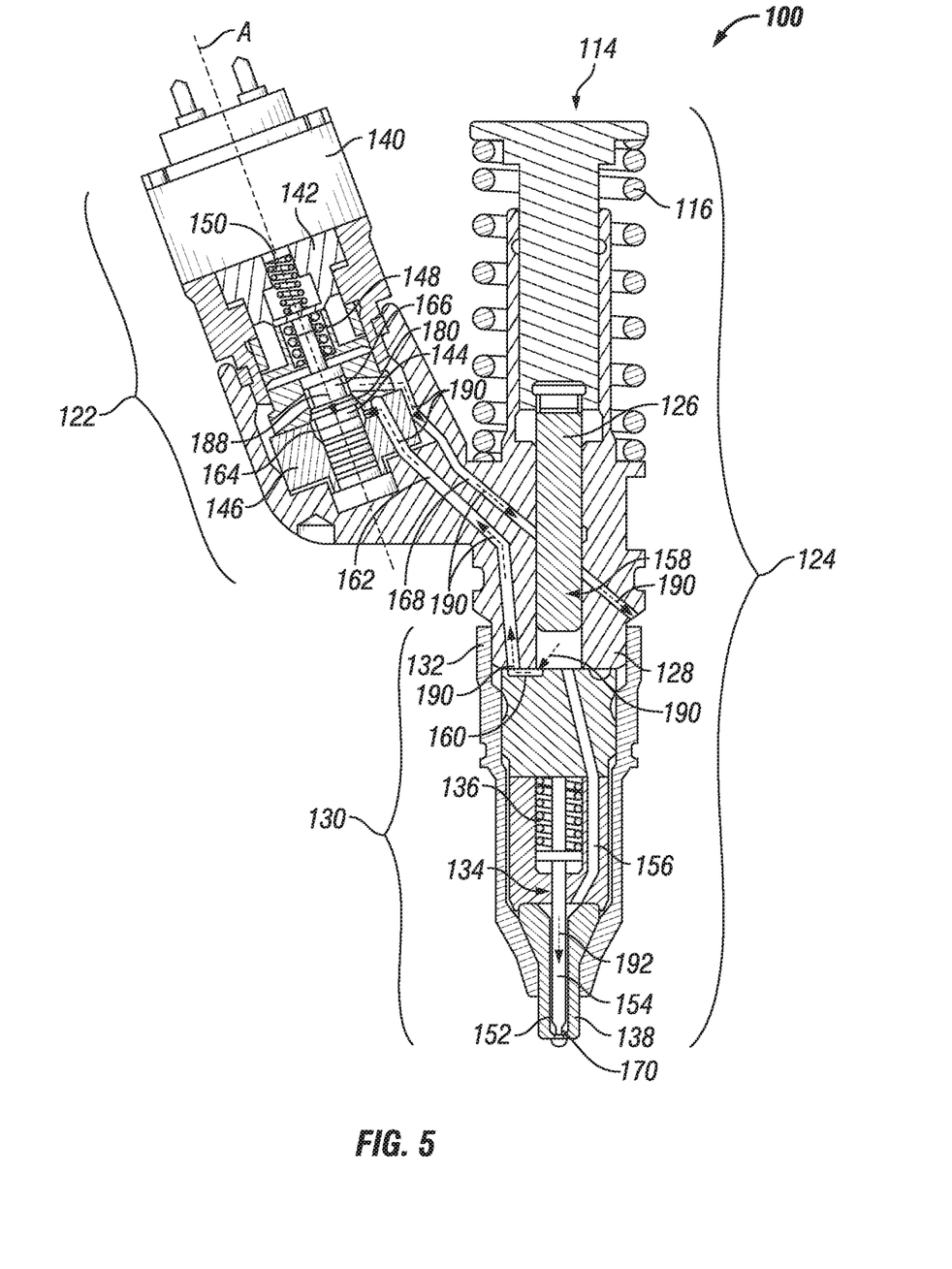
FIG. 5 illustrates the fuel injector assembly of FIG. 2 in an end-of-injection state.

FIG. 5 illustrates the fuel injector assembly 100 in the end of injection stage or configuration. The injection is maintained while the plunger 126 moves downward as explained with reference to FIG. 4 and the energized solenoid 140 keeps the poppet valve member 144 seated against the valve seat 180, that is to say, in a closed configuration. When the ECM determines that injection should be stopped, the voltage signal to the solenoid is reduced to zero. As a result, the magnetic force pulling up on the poppet valve member 144 through the armature 142 and other components therebetween, is removed, allowing the return springs 148, 150 to move the poppet valve member downwards along the longitudinal axis A (see arrow 188). Once the poppet valve member 144 opens by moving away from the valve seat 180, high pressure fuel from the pressurized fuel chamber 158 may flow (see arrows 190) through the reservoir 160, first exhaust passage 162, around the poppet valve member 144 into the control valve chamber 164, second exhaust passage 168, then into the fuel supply passage (not shown) and finally into the low pressure fuel reservoir (not shown).

As a result, a rapid drop of pressure in the main injection assembly 124 occurs and the check valve 134 closes as the needle 154 moves downward (see arrow 192), biased by the check valve return spring 136 and shuts off on the valve seat. This may occur once the injection pressure drops below 5 ksi. This ends the injection stage. Sometimes, the inertia of the various components of the control valve assembly 122 including the return springs 148, 150, may cause a bouncing or oscillating movement of the poppet valve member 144 that may cause after-injections as described earlier herein. However, a bounce limiting mechanism may be present in this injector assembly that helps prevent this as will be described later herein.

Figure 6:
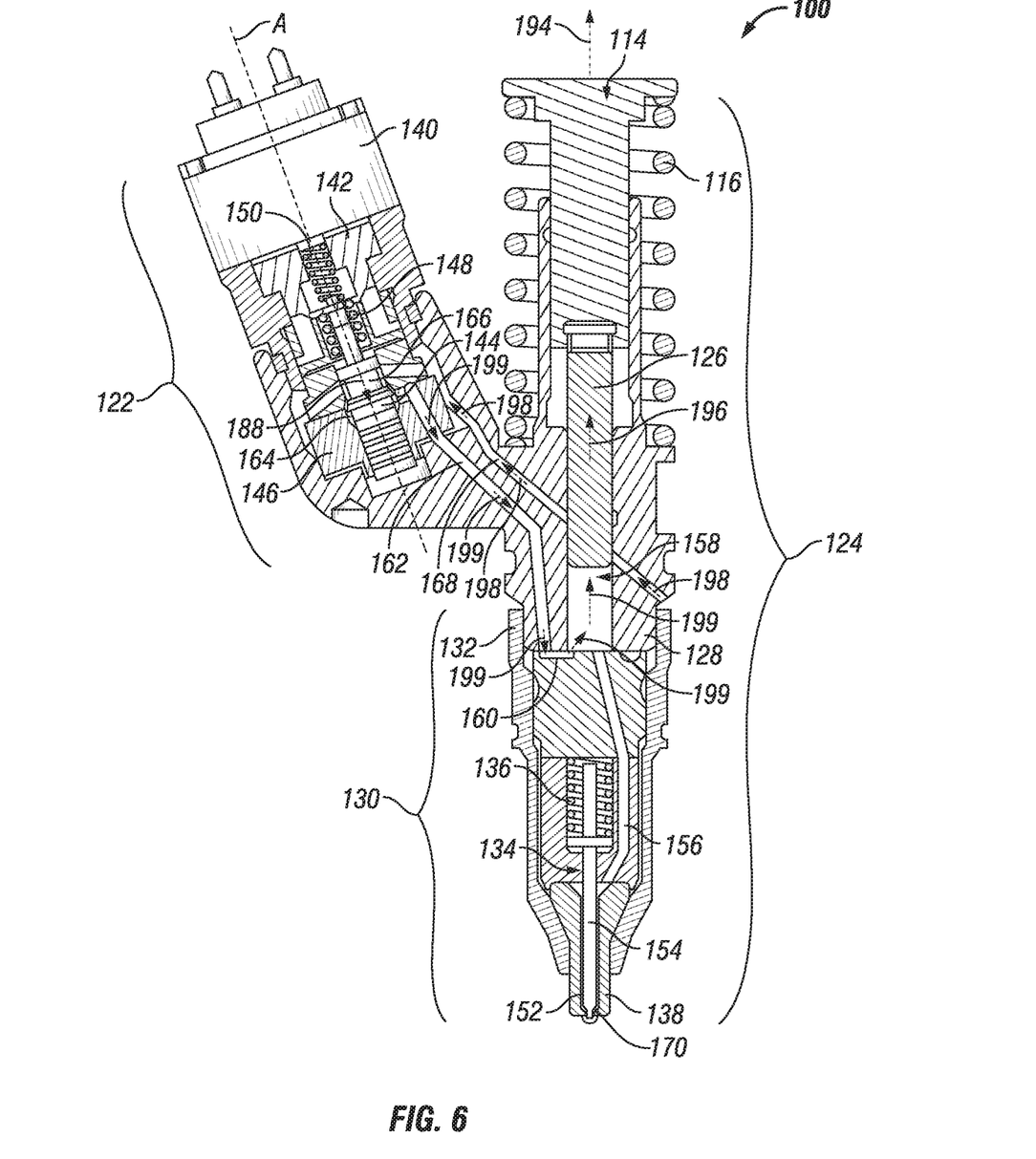
FIG. 6 illustrates the fuel injector assembly of FIG. 2 in a filling state.

At this point, the pressurized fuel chamber 158 is mostly empty, needing to be refilled. FIG. 6 shows the fuel injector assembly 100 in its fill configuration. The tappet 114 is forced upward (see arrow 194) by the return spring 116 as the third lobe (not shown) is no longer pushing down on the tappet 114. This also causes the plunger 126 to move upward (see arrow 196), causing a vacuum or other pressure that is less than the fuel supply pressure to be present in the pressurized fuel chamber 158. This causes fuel to flow from the fuel reservoir (not shown) through the fuel supply passage (not shown) into the second exhaust passage 168 (see arrows 198). This direction is reversed from the pre-injection direction. Thus, the exhaust passages become fill passages 162, 168. The poppet valve member 144 is in the open position, allowing the fuel to enter the control valve chamber 164, bypass the open poppet valve member 144, and flow into the first fill passage (see arrows 199). Finally, the fuel then enters the reservoir 160 and then the pressurized fuel chamber 158. This continues until the plunger 126 and tappet 114 reach their topmost position. The fuel injector assembly 100 is now ready for the cycle to repeat itself starting with the pre-injection stage.

It should be noted that the pressurized fuel chamber in this embodiment is pressurized mechanically by the plunger, tappet and cam shaft. However, this pressurization may be caused by a plunger moved hydraulically. In yet other embodiments, this pressurization may achieved by providing direct fluid communication between the pressurized fuel chamber and a high pressure fuel source such as a common rail, etc.

Figure 7:
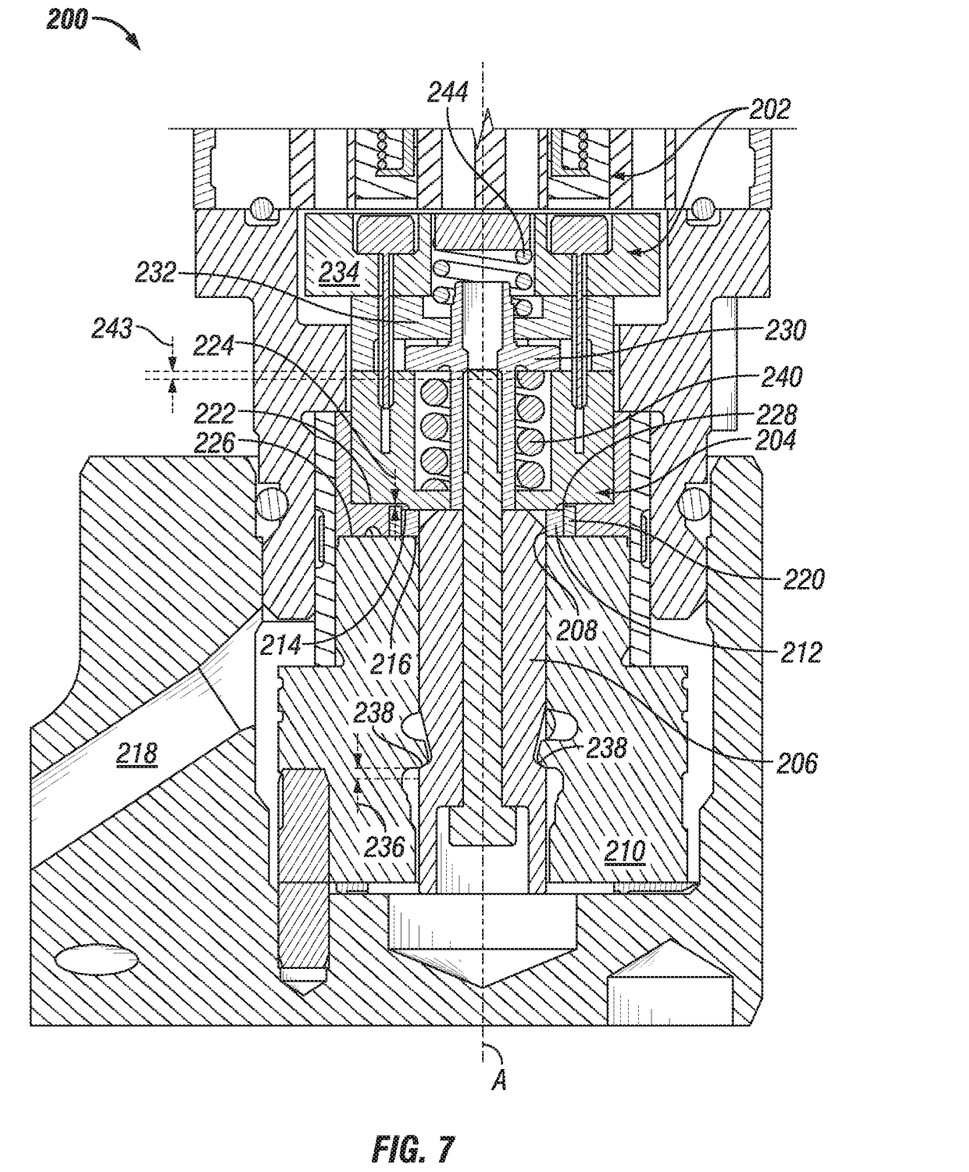
FIG. 7 is side cross-sectional view of an embodiment of a control valve assembly of a fuel injector assembly of the present disclosure that uses an inner lift shim member and an outer lift shim member to create more squeeze film damping, helping to prevent valve member bounce.
Figure 8:
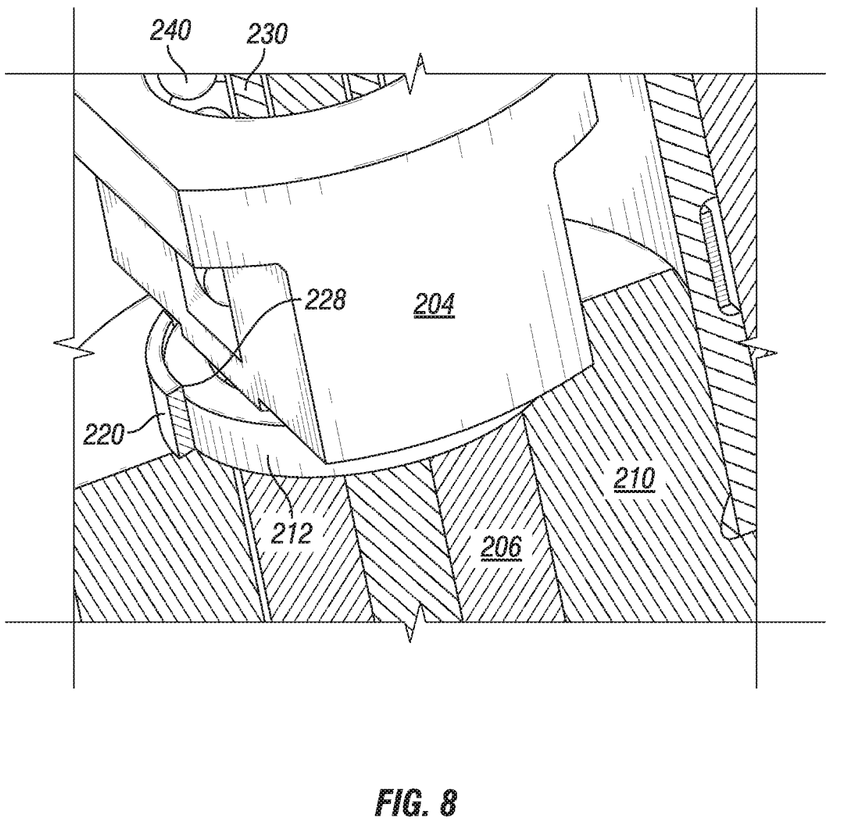
FIG. 8 is a perspective partial cross-sectional view of the control valve assembly of FIG. 7 showing the outer and inner lift shim members.

Turning the reader's attention now to FIGS. 7 and 8, a fuel injector assembly that includes a main injection assembly similar to what has been previously described with reference to FIG. 1 thru 6 may use a control valve assembly 200 similar to what is depicted in FIGS. 7 and 8. The control valve assembly 200 may include a valve actuating mechanism 202, a cage member 204 that is operatively connected to the valve actuating mechanism 202, a poppet valve member 206 that is operatively connected to the cage member 204 and that defines a perimeter 208 and a longitudinal axis A, a valve sleeve member 210 that is disposed about the poppet valve member 206, and an inner shim 212. The inner shim 212 may include an upper surface 214 that at least partially makes uninterrupted contact with the cage member 204 and a lower surface 216 that at least partially makes uninterrupted contact with the sleeve member 210, thereby providing a fluid seal about the perimeter 208 of the poppet valve member 206. That is to say, there are no flow paths provided on the upper and lower surfaces of the inner shim. A fluid drain line 218 may also be seen.

The valve actuating mechanism 202 may include the use of a solenoid, a piezoelectric device, or any other valve actuating mechanism known or that will be devised in the art.

The control valve assembly 200 may further comprise an outer shim 220 that is taller than the inner shim 212 along the longitudinal axis A and that makes uninterrupted contact with the valve sleeve member 210. In this embodiment, the cage member 204 includes an upper surface 222 and the outer shim 220 is positioned adjacent the upper surface 222 of the cage member 204 and forms a gap 224 between the outer shim 220 and the upper surface 222 of the cage member 204, creating a bounce limiting mechanism using squeeze film damping. This gap may be on the order of 0.1 to 0.5 mm. Other bounce limiting mechanisms may be used as will be described later herein. For this embodiment, the outer shim 220 sits on the upper surface 226 of the sleeve member 210 and is immediately adjacent the inner shim, making or nearly making contact with the inner shim. Also, the upper and lower surfaces of the outer shim lack any recesses to allow liquid to flow by it.

For this embodiment, the inner shim 212 and outer shim 220 are made from separate components. However, they may be made out of a unitary piece of material or may comprise separate components that are adhered to each other, preventing movement of the inner and outer shim members relative to each other along the longitudinal axis A. When they are made from separate components and are not adhered to each other, then the inside upper corner 228 of the outer shim 220 may be chamfered, allowing hydraulic forces to push the outer shim 220 in a downward direction as the cage member 204 approaches the poppet valve member 206.

For this embodiment, the lower surface 306 of the cage member 204 (see FIGS. 7-9) interfaces with the upper surface 310 of the poppet valve member 206 (see FIGS. 7-9), and the lower surface 306 of the cage member 204 and the upper surface 310 of the poppet valve member 206 are configured to provide a separable joint between the poppet valve member 206 and the cage member 204. An explanation of the structure leading to this separable joint is forthcoming. This separable joint may not be present in other embodiments.

The control valve assembly 200 of FIGS. 7 and 8 may operate in the following manner to achieve the closed configuration as shown in these figures. First, a command voltage is applied across the solenoid 202 to initiate the creation of a magnetic force. Second, the poppet valve member 206, the pillar member 230, the cage member 204, the spacer member 232, and the armature member 234 moves as one unit as the poppet valve member 206 moves through its lift distance 236 to the poppet seat 238. This is true because the armature 234, spacer member 232, and the cage member 204 are bolted together, forcing them to move together. The pillar member 230 is biased upwardly by the auxiliary spring 240, which causes the poppet valve member to also move upwardly through its bolted connection to the pillar member 230. This illustrates how the poppet valve member 206 may be operatively connected to the armature 234 or other valve actuating mechanism 202 but other operative connections are possible such as having a solid or rigid connection between the armature and the poppet valve member.

The motion of the poppet valve member 206 stops as the poppet valve member reaches its seat 238. This causes injection of fuel into the combustion chamber by the fuel injector assembly. However, the cage member 204, the spacer member 232 and the armature 234 may continue to move as it moves through the Assisted Valve Opening (AVO) distance (see 243).

When it is desired to end injection, the command voltage ends and the magnetic force begins to decay. The timing spring 244 force begins to push the cage member 204, spacer member 232 and armature 234 downwardly. These components move until the AVO distance 243 is exhausted, causing the poppet valve member 204 and pillar member 230 to move downwardly until the poppet valve member 204 moves off of the poppet seat 238 and back through the lift distance 236 until it reaches its original starting position. At this point the poppet valve member and the pillar member as well as the cage member, spacer member, and armature subassembly can oscillate or bounce in an uncontrollable manner which may cause valve performance problems. The bounce limiting mechanism may help to eliminate such problems by slowing the approach of the cage member to the poppet valve member.

Figure 9:
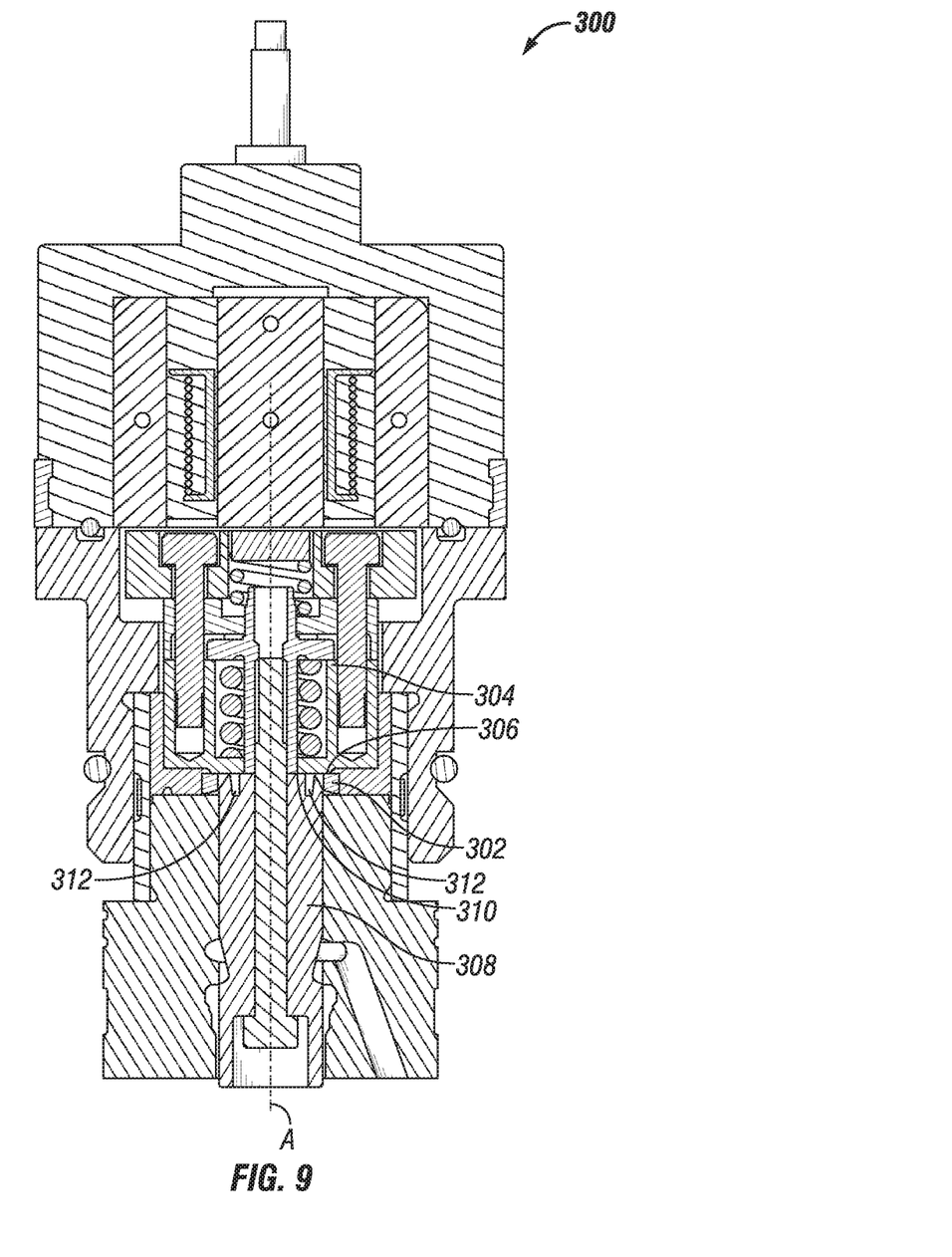
FIG. 9 is a side cross-sectional view of another embodiment of a control valve assembly of a fuel injector assembly of the present disclosure that uses grooves located in either the cage or the poppet valve member to create more squeeze film damping, helping to prevent valve or cage member bounce.
Figure 10:
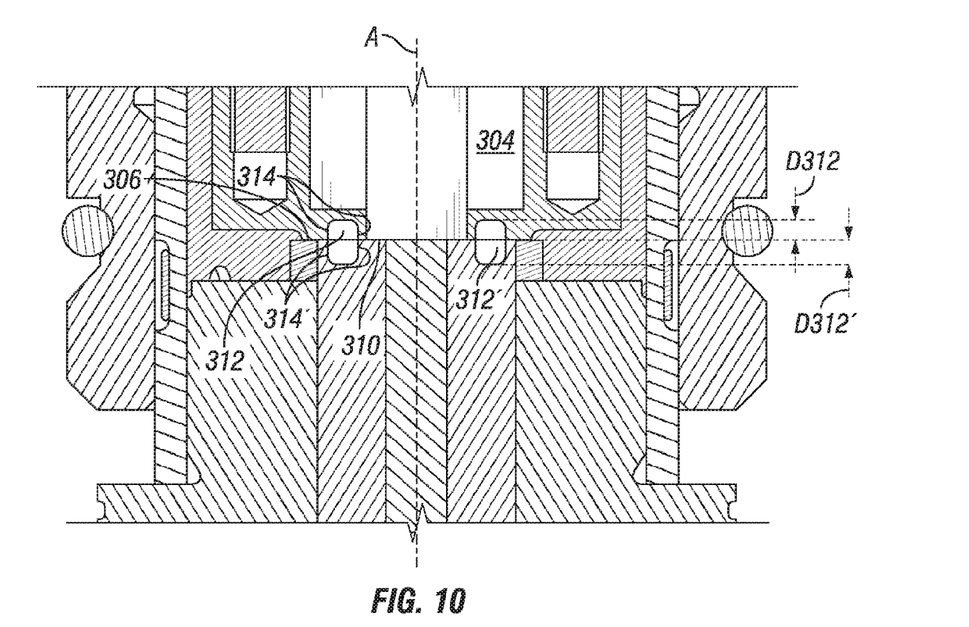
FIG. 10 is an enlarged side cross-sectional view of the control valve assembly of FIG. 9 showing grooves placed on opposing surfaces of the cage and poppet valve member that create squeeze film damping, helping to prevent the valve member or cage member from bouncing.

Another proposed solution to this problem is to provide another bounce limiting mechanism by adding a fluid volume element between the poppet valve member and the cage member. This bounce limiting mechanism is illustrated by FIGS. 9 and 10 that disclose a control valve assembly 300 that is similarly constructed and operated as the control valve assembly 200 of FIGS. 7 and 8 except for the following differences. The outer shim is eliminated and a single shim 302 is kept. In some embodiments, no shim may be needed or desired.

The cage member 304 includes a lower surface 306 and the poppet valve member 308 includes an upper surface 310, wherein the lower surface 306 interfaces with the upper surface 310, and the lower surface 306 of the cage member 304 and the upper surface 310 of the poppet valve member 308 are configured to provide a separable joint between the poppet valve member and the cage member and at least one of the cage member 304 and poppet valve member 308 defines a groove 312 that communicates only with a surface 306, 310 that forms the separable joint. For this embodiment, both the cage member 304 and the poppet valve member 308 have such grooves 312, 312'.

Closer inspection of the geometry as best seen in FIG. 10 shows that the lower surface 306 of the cage member 304 defines a groove 312 having sidewalls 314 and the upper surface 310 of the poppet valve member 308 defines a groove 312' having sidewalls 314' and the sidewalls of one groove align with the sidewalls of the other groove. This means that the grooves share the same width. The groove 312 of the cage member defines a depth D312 along the longitudinal axis A and the groove 312' of the poppet valve member defines a depth D312' along the longitudinal axis A, wherein the depth of the groove of the valve member is greater than the depth of the groove of the cage member. The grooves may have a width of approximately 1.5 mm and a depth of 1.5 mm. In some embodiments, the depth of the grooves may be different from the cage member to the valve member or the same. In yet other embodiments, the depth groove of the cage member may be greater than that of the valve member, etc. Also, the widths of the grooves may not be aligned and/or may have different widths than each other, etc.

It is to be understood that the grooves may have a substantially circular annular shape that is rotated about the longitudinal axis A but other configurations are considered to be within the scope of the present disclosure.

This bounce limiting mechanism would have little to no effect on the upward valve and armature motion or on the performance of the valve in the fully closed state. It may have a limited dampening effect on the valve and armature as they move downward from the fully closed state to the fully open state.

As the valve reaches its fully open state, over travels, and begins to move upward and back to its initial position, the fluid squeezed between the grooves will have a dampening effect and absorb some of the energy of the valve-armature system and limit the motion of the system. As a result, the ability of an extended or secondary injection event to form will also be limited.

INDUSTRIAL APPLICABILITY

In practice, a control valve assembly that uses any of the bounce limiting mechanisms described herein may be provided, sold, manufactured, bought etc. to refurbish or remanufacture existing fuel injector assemblies to help limit the problem of valve bounce. Similarly, a fuel injector assembly may also be provided, sold, manufactured, bought, etc. to provide a new fuel injector that is less prone to valve bounce than has been yet made available to the public. The fuel injector assembly may be new or refurbished, remanufactured, etc.

Referring back to FIGS. 7-10, the fuel injector control valve assembly 200, 300 may comprise a valve actuating mechanism 202, a cage member 204, 304 that is operatively connected to the valve actuating mechanism 202, a poppet valve member 206, 308 that is operatively connected to the cage member 204, 304, and that defines a perimeter 208 and a longitudinal axis A, a valve sleeve member 210 that is disposed about the poppet valve member, and a shim 302, 212, 220.

The shim 212 may include an upper surface 214 that at least partially makes uninterrupted contact with the cage member 204 and a lower surface 216 that at least partially makes uninterrupted contact with the sleeve member 210, thereby providing a fluid seal about the perimeter 208 of the poppet valve member 206. Also, a bounce limiting mechanism may be provided that is interposed between the cage member 204, 304 and at least one of either the poppet valve member 206, 308 and the valve sleeve member 210. The bounce limiting mechanism may include the inner and outer shim of FIGS. 7 and 8 or the groove of FIGS. 9 and 10.

Figure 11:
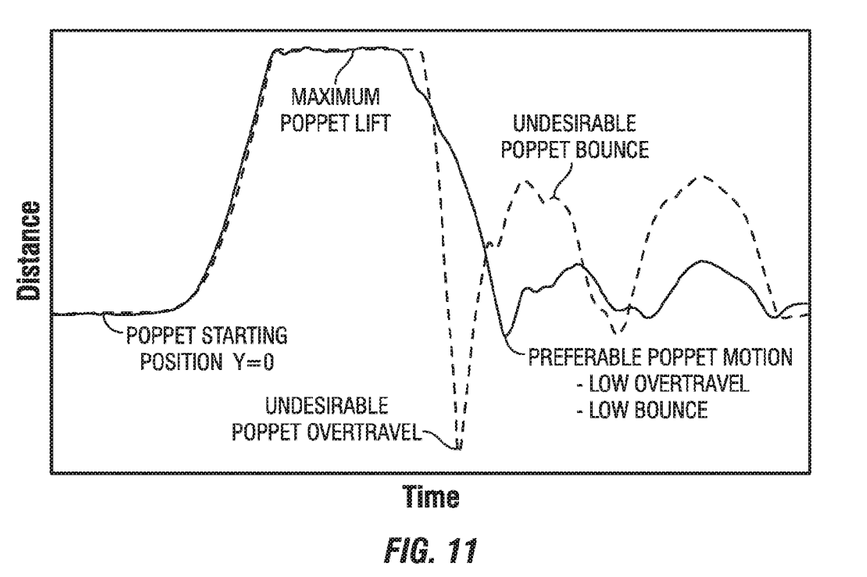
FIG. 11 is a graph showing how the poppet valve displacement varies with time for the improved design of FIGS. 9 and 10 versus the prior art design.

When using a suitable bounce limiting mechanism such as the groove 312 of FIGS. 9 and 10, the amount of valve bounce may be reduced as shown in FIG. 11. This is a graph of the position of a valve member versus time during various stages of a fuel injector. One curve (dotted line) shows the amount of undesirable valve travel at the end of injection and the subsequent undesirable valve bounce that occurs thereafter. A first and a second after-injection event are also common. Conversely, the second curve (solid line) shows that the amount of over travel of the valve member is reduced when the bounce limiting mechanism is employed and subsequent after-injection events are also reduced.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A fuel injector assembly comprising:
    a main injection assembly including:
        a housing that defines a pressurized fuel chamber;
        a nozzle assembly that includes a check valve assembly; and
    a control valve assembly including:
        a valve actuating mechanism;
        a cage member that is operatively connected to the valve actuating mechanism;
        a poppet valve member that is operatively connected to the cage member and that defines a perimeter and a longitudinal axis;
        a valve sleeve member that is disposed about the poppet valve member;
    an inner shim that includes an upper surface that at least partially makes uninterrupted contact with the cage member and a lower surface that at least partially makes uninterrupted contact with the sleeve member, thereby providing a fluid seal about the perimeter of the poppet valve member; and
    an outer shim that is taller than the inner shim along the longitudinal axis and that makes uninterrupted contact with the valve sleeve member and that is immediately adjacent the inner shim;
    wherein the cage member includes an upper surface and the sleeve member includes an upper surface, and the outer shim is positioned adjacent the upper surface of the cage member and forms a gap between the outer shim and the upper surface of the cage member, creating a bounce limiting mechanism using squeeze film damping.

2. The fuel injector assembly of claim 1 wherein the inner shim and outer shim are made from separate components.

3. The fuel injector assembly of claim 1 further comprising a plunger that is disposed in the pressurized fuel chamber.

4. The fuel injector assembly of claim 3 further comprising a tappet that is operatively connected to the plunger.

5. The fuel injector assembly of claim 1 wherein the valve actuating mechanism includes a solenoid.

6. The fuel injector assembly of claim 1 wherein the lower surface of the cage member interfaces with the upper surface of the poppet valve member, and the lower surface of the cage member and the upper surface of the poppet valve member are configured to provide a separable joint between the poppet valve member and the cage member.

* * * * *